Feb. 28, 1950 G. T. ROYDEN 2,498,711

HIGH-FREQUENCY AMPLIFIER

Filed April 2, 1945 2 Sheets-Sheet 1

INVENTOR.
GEORGE T. ROYDEN
BY Robert Harding Jr.
ATTORNEY

Feb. 28, 1950 G. T. ROYDEN 2,498,711

HIGH-FREQUENCY AMPLIFIER

Filed April 2, 1945 2 Sheets-Sheet 2

INVENTOR.
GEORGE T. ROYDEN
BY
Robert Harding Jr.
ATTORNEY

Patented Feb. 28, 1950 2,498,711

UNITED STATES PATENT OFFICE 2,498,711

HIGH-FREQUENCY AMPLIFIER

George Taylor Royden, South Orange, N. J., assignor to Federal Telephone and Radio Corporation, New York, N. Y., a corporation of Delaware Application April 2, 1945, Serial No. 586,055

6 Claims. (Cl. 179—171)

This invention relates to improved means for efficiently obtaining amplified high frequency electric waves.

It has been fully realized by those skilled in the art that the efficiency of apparatus heretofore known for the production of amplified high frequency electric waves, such, for example, as those used in radio, is relatively low. Many attempts have been made to obtain increased efficiency in apparatus employed for the production of such amplified waves, but without satisfactory results up to the present time.

It has been known that a large part of the loss of efficiency is inherently due to the use of sine waves in the amplifier or multi-stage amplifiers. It has also been known from a theoretical standpoint that if square-top waves could be produced and maintained in the amplifying means, improved efficiency might be obtained. However, since, as is well known, a square-top wave may be analyzed as the resultant of the combination of a plurality of component sine waves of different frequencies, different amplitudes, and out of phase relations, it has been realized that because the impedance in the circuits varies with the frequency, the square-top waves degenerate to distorted waves, so that no gain in efficiency can be satisfactorily obtained with apparatus heretofore employed.

In general, a close approach to a square-top wave is attained by the combination of a sine wave of any given fundamental frequency with its third and its fifth harmonics, where the maximum amplitudes of the harmonics are each in the proper proportion to that of the fundamental, the higher odd harmonics being considered as too small in amplitude to materially affect the shape of the resultant wave. Of course, there must be the proper phase relation between the fundamental wave and its third and fifth harmonics, respectively.

Owing to the fact that the inductive reactance and the capacitive reactance of circuit are each a function of the frequency, it results that a square-top wave cannot maintain its form in a circuit having inductive or capacitive reaction or both, even though, in the latter case, the reactive elements be so chosen that the circuit would be resonant for any one of the three component frequencies. The reactances cause phase shifting of the component waves with consequent distortion of the resultant wave and loss of efficiency. It is the principal object of the present invention to provide an apparatus using vacuum tubes in a special network of circuits which will enable amplified high frequency electric waves to be produced with high efficiency in a very simple manner.

More specifically considered, the object of the present invention is to provide a relatively simple apparatus which will develop and maintain in the amplifier tubes a satisfactory form of waves of substantially square-top type, whereby the efficiency of the amplifier tubes is materially increased above anything heretofore obtainable, while at the same time the overall efficiency of the entire apparatus will be high and its reliability in operation of the highest order.

With the above objects in view and some others which will be apparent to those skilled in the art from the description hereinafter, the invention, broadly considered, comprises at least one thermionic amplifier tube having a cathode, a plate and a grid, a plate circuit network for the plate of the tube, which network, in the best embodiment of the invention, will provide the equivalent of a separate circuit for each of the component frequencies of a square-top wave, means for supplying current to the plate of the amplifier tube, and means for developing, from a source of sine waves of the required fundamental frequency, a grid-biasing pulsatory voltage of such form as to have a symmetrical substantially constant maximum during not less than 90° of each half cycle of the fundamental frequency, the voltage being applied to the grid to control the plate current of the amplifier tube.

The invention further comprises a relatively simple, reliable, and reasonably efficient means for producing and applying the above-described grid-biasing voltages.

While in the most advantageous embodiment of the invention, the parallel branches should be at least three in number, each designed to pass the fundamental, its third harmonic and the fifth harmonic, respectively, it has been found in practice that a close approximation to high efficiency may be attained by employing only two parallel branches in the exterior portion of the plate circuit, one designed for either the fifth or the third harmonic, but preferably the third, while the other branch circuit is such as to pass the fundamental. The last branch is in inductive relation to the transmission line, antenna, or other load circuit has a loop containing an inductor primary, this loop being tuned to the fundamental frequency.

The invention further consists in the details of arrangement of circuits and combinations of the same with the requisite apparatus as hereinafter more fully set out in connection with the accompanying drawings, illustrating several embodiments of the invention, in which Fig. 1 is a diagrammatic view of one embodiment of the invention in which only two parallel branches are provided in each of the plate circuits, and the fundamental wave is utilized to energize the work circuit, in this case illustrated as an antenna.

Figure 1:
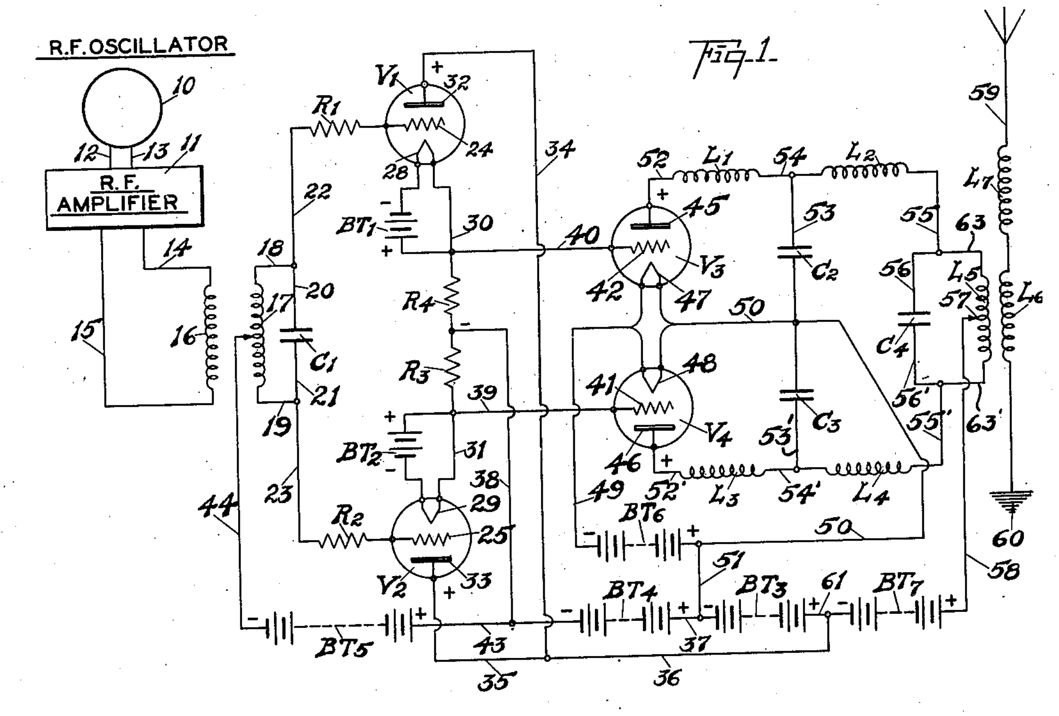

Referring to Fig. 1 of the drawings, 10 indicates a source of high frequency waves of the usual sine wave form and of the required frequency. Any suitable means may be employed for producing these waves, as, for example, the usual radio frequency oscillator with crystal control such as is in general use for supplying radio frequency carrier waves.

In practice it is advantageous to produce the high frequency current with a relatively higher voltage and lower amperage than is usual, since by the present invention the purpose is to provide a voltage bias on the amplifier grids, through a voltage dropping resistor.

The output from the source 10 is supplied to the usual amplifying means indicated generally at 11, over conductors 12 and 13. The amplifying means 11 may be of the usual type employed to amplify radio frequency carrier waves, and while here shown as a single stage amplifier, a plurality of stages of amplification may be used if desired.

The output from the amplifying means 11 is delivered through lines 14 and 15 to an inductor primary 16, which when energized by current from the amplifying means 11, induces a voltage in the associated inductor secondary 17, which is included in a local circuit including conductors 18, 19, 20 and 21, this local circuit including capacitor $C_1$. The inductor secondary 17 and the capacitor $C_1$ are of such electrical dimensions that the local circuit in which they are both included will be resonant at the operating frequency.

From opposite ends of the local circuit, grid conductors 22 and 23 lead to the respective grids of vacuum tubes $V_1$, $V_2$, these grids being indicated at 24 and 25, respectively. In series with the grid 24 a resistor $R_1$ is included and in series with the grid 25 a resistor $R_2$ is provided, these resistors $R_1$ and $R_2$ advantageously being as nearly non-inductive as can be obtained and of such ohmic resistances as to absorb the excess excitation voltage over that required to drive the grid to saturation, thus aiding in obtaining a substantially constant bias on the grids 24 and 25 for as much of each half cycle as is obtainable in practice. As the voltage on each grid rises from a negative potential to a maximum positive potential and remains at that value for an appreciable part of the half cycle, substantially square-top waves are developed in the plate circuits of the tubes $V_1$, $V_2$. By employing a non-inductive resistor the distortion of wave shape which would arise from an out of phase counter electro-motive force which might be developed by inductance in a resistor will be avoided as much as possible.

The vacuum tubes $V_1$ and $V_2$ are similar, each having a cathode, in the present case shown as a filament, these cathodes being indicated at 28 and 29, respectively.

The cathodes are arranged to be heated in any suitable way. Where filaments are used they may be included directly in heating circuits energized in the usual way. As shown, the circuit for filament 28 includes a conductor 30 and a battery $BT_1$. The circuit for filament 29 includes a conductor 31 and a battery $BT_2$.

Each vacuum tube $V_1$, $V_2$ has an anode or plate, as indicated at 32 and 33, respectively. These plates are arranged to be conducted in parallel branches of a plate circuit, the branch conductors being indicated at 34 and 35, respectively, these branch conductors being connected to a common conductor 36 leading from a suitable source of uniform direct current, in the present case exemplified by at least two batteries $BT_3$ and $BT_4$ shown as joined in series over a conductor 37.

A common plate circuit return conductor is indicated at 38 which leads from the negative pole of battery $BT_4$ to an intermediate connection of two cathode resistors $R_3$ and $R_4$, respectively, the resistor $R_3$ in this example connecting to conductor 31 of one cathode heating circuit, while the other resistor $R_4$ connects to conductor 30 of the other cathode heating circuit.

There is a connection from the plate circuit return conductor 38 to the electrical center of the inductor secondary 17, this connection including conductor 43, battery $BT_5$, and conductor 44 whose terminal may be adjusted along the inductor secondary 17. The battery $BT_5$ supplies a predetermined negative potential on the grids 24 and 25 of tubes $V_1$ and $V_2$ through the inductor secondary 17 and the respective resistors $R_1$, $R_2$.

The vacuum tubes $V_1$, $V_2$ and the circuit systems and energy sources with which they are connected constitute means for providing variable control for two vacuum tube amplifiers $V_3$, $V_4$, respectively, whose grids are indicated at 42 and 41, respectively. The grid 41 is in electrical connection with the cathode of vacuum tube $V_2$. Where the cathode is a filament as shown in the drawings, the electrical connection may be through a grid conductor 39 leading to a suitable point on the filament heating circuit of tube $V_2$. A similar electrical connection is provided between the grid 42 and the cathode of tube $V_1$, in this case indicated as a grid conductor 40, leading from the grid 42 to a suitable point on the filament heating circuit of tube $V_1$.

The battery $BT_4$ supplies a predetermined constant negative grid bias to the grids 42 and 41 of the amplifier tubes $V_3$ and $V_4$ through the cathode resistors $R_4$ and $R_3$, respectively.

The amplifying vacuum tubes $V_3$ and $V_4$ have anodes or plates, as indicated at 45 and 46, respectively. They also have suitable cathodes, which in the present example are shown as filaments, indicated at 47 and 48, respectively. These filaments may be so connected as to be heated by a single source of heating current. In the present example a battery $BT_6$ is provided, the negative pole of the battery being connected by a conductor 49, having a branched end, to the negative side of both filaments 47 and 48. The positive pole of the heating battery $BT_6$ is connected, over a conductor 50 having a branched end, to the positive side of both filaments 47 and 48. The heating battery circuit is cross-connected to the connector 37 between batteries $BT_3$ and $BT_4$ by a conductor 51.

In the present example, the plate circuit of each amplifier tube $V_3$, $V_4$ may be considered as a composite of a circuit having successive elements of a low pass filter, these elements being designed to pass the third harmonic of the fundamental frequency, terminating in a circuit resonant at the fundamental frequency. The two circuits have parts in common, as will now be explained, reference being particularly made to the plate circuit of amplifier tube $V_3$. The circuit path for a higher harmonic frequency, say the fifth harmonic, is from plate 45, over conductor 52, through inductor $L_1$, thence over conductor 53 to and through capacitor $C_2$ to a point on conductor 50 and thence to the cathode 47. The electrical dimensions of inductor $L_1$ and capacitor $C_2$ are so chosen, when taken with the interelectrode capacitances, that the circuit just described will be capable of by-passing the fifth harmonic and higher harmonics.

The second plate circuit comprises the conductor 52, the inductor $L_1$, a conductor 54, inductor $L_2$, conductor 55, a loop comprising a conductor 56, a part of inductor primary $L_5$ to the adjustable end 57 of conductor 58, thence to the positive pole of battery $BT_7$, through battery $BT_3$, over cross-connector 51 to conductor 50, and thence back to the cathode of tube $V_3$.

The inductor primary $L_5$ is in a loop circuit which includes conductors 56 and 56′ and a capacitor $C_4$, the inductor $L_5$ and capacitor $C_4$ being of such electrical dimensions that the loop circuit is resonant to the fundamental frequency.

The inductor primary $L_5$ is in inductive relation to an inductor secondary $L_6$ in the work circuit. In the present case this work circuit, for the sake of simplicity, is shown as an antenna 59 grounded at 60, and, in case of need, including an inductor $L_7$.

The amplifier tube $V_4$ has a composite plate circuit system similar to that already described for tube $V_3$, the corresponding conductors being given the same reference numerals with a prime mark, the inductors corresponding to inductors $L_1$ and $L_2$ being marked $L_3$ and $L_4$, respectively, and the capacitor corresponding to $C_2$ being marked $C_3$.

It will be seen that the plate current is furnished by the two batteries $BT_7$ and $BT_3$, the circuit being traced from the positive pole of battery $BT_7$ over conductor 58 to the adjustable end 57, where the circuit divides, one path passing over a part of inductor $L_5$ to the plate 45 of amplifier tube $V_3$, by way of conductors 63 and 55, inductor $L_2$, conductor 54, inductor $L_1$ and conductor 52 to the plate. The return path would be from the cathode 47, conductor 50, cross-connector 51 to the negative pole of battery $BT_3$, the two batteries being connected by a conductor 61.

The plate current for the tube $V_4$ will be the same as for tube $V_3$ up to the point 57 on the inductor primary $L_5$ where the circuit divides, the path for tube $V_4$ passing over a part of inductor primary $L_5$ to conductor 63′ then over conductor 55′, inductor $L_4$, conductor 54′, inductor $L_3$ and conductor 52′ to plate 46. The return path from the cathode 48 of tube $V_4$ is the same as that for cathode 47 hereinbefore described.

The inductors $L_2$ and $L_4$ are conveniently made equal to inductors $L_1$ and $L_3$, all being so dimensioned with respect to the interelectrode capacitance of tubes $V_3$ and $V_4$ and the capacitances $C_2$ and $C_3$ that the third harmonic of the fundamental frequency will be passed but not the higher harmonics.

Because of the use of the loop containing the inductor, primary $L_5$ tuned to the fundamental frequency by the capacitor $C_4$, the fly wheel action in said loop will tend to give a good transfer of fundamental sine wave to the work circuit.

The production of a substantially square top wave may be explained as follows: When the positive voltage in the tank circuit from lead 18 to lead 44 exceeds the combined bias in battery $BT_5$ and resistor $R_4$, the grid of vacuum tube $V_1$ becomes positive with respect to its cathode and grid current begins to flow. The voltage drop, which is negligible with no grid current, becomes appreciable as soon as grid current flows through resistor $R_1$. With the circuit shown, the potential of the cathode will follow the rise in potential of the grid until both grid and plate approach the potential of the plate battery $BT_3$ and $BT_4$. Further rise in grid tank circuit potential results in but a small rise in grid potential because the attendant rise in grid current causes a corresponding rise in voltage drop in the grid resistor $R_1$.

Figure 2:
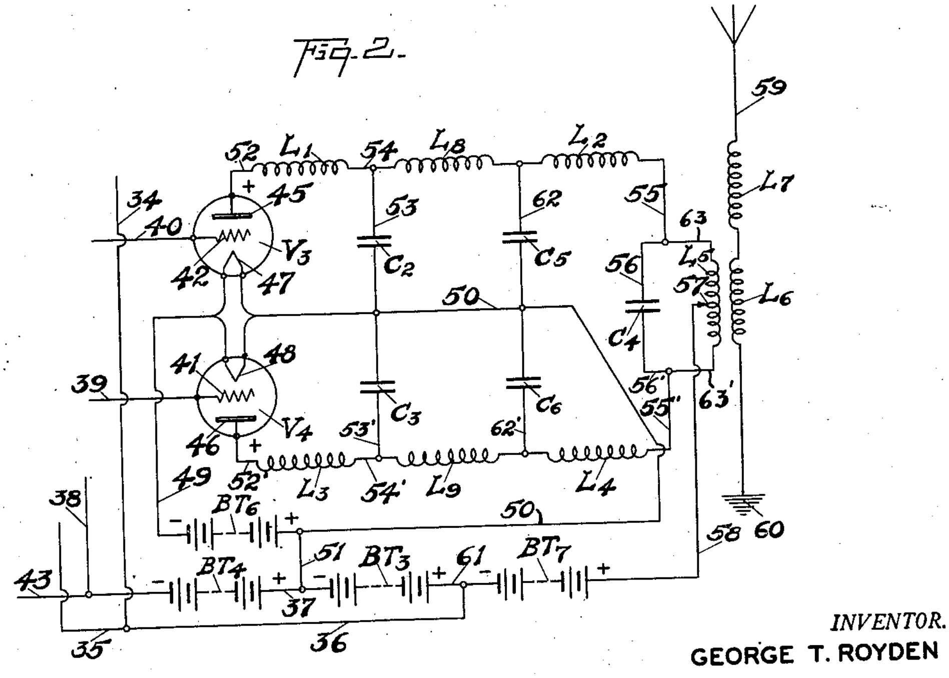
Fig. 2 is a detail diagrammatic view showing a modification of the plate system of Fig. 1, whereby each amplifier plate circuit is provided with three branches, to pass separately the fundamental, the third harmonic and the fifth harmonic, respectively, but only the fundamental is used to energize the work circuit, in this case illustrated as an antenna.

Instead of the plate circuit network shown in Fig. 1, it is advantageous to provide a plate circuit which will accept higher frequencies, namely, the fundamental, the third harmonic and the fifth harmonic. The manner in which this may be done is illustrated in Fig. 2, which shows only the modification of the plate circuit network, it being understood that all parts up to and including the amplifier tubes are as shown in Fig. 1.

The only difference so far as can be shown by the drawings, is the introduction of another series inductor for each tube $V_3$, $V_4$, as indicated at $L_8$, $L_9$, respectively, and another shunt capacitor for each tube, the by-pass conductors being indicated at 62, 62′, respectively, and the capacitors at $C_5$, $C_6$, respectively.

In this modification the inductor $L_1$ is so dimensioned as to provide, with the interelectrode capacitance of tube $V_3$ and a portion of capacitance $C_2$, a low pass filter element that will pass the fifth harmonic. The remainder of capacitor $C_2$ and a portion of capacitor $C_5$ in conjunction with inductor $L_8$ comprise a low pass filter that should be designed to pass the third harmonic.

In this modification, the inductor $L_2$ must be so dimensioned that, when taken with the remainder of capacitor $C_5$ and a portion of capacitor $C_4$, they will comprise a low pass filter for the fundamental frequency.

In this modification, the elements in the plate circuit of tube $V_4$ must be made substantially equal to the corresponding elements in the plate circuit of tube $V_3$.

Figure 3:
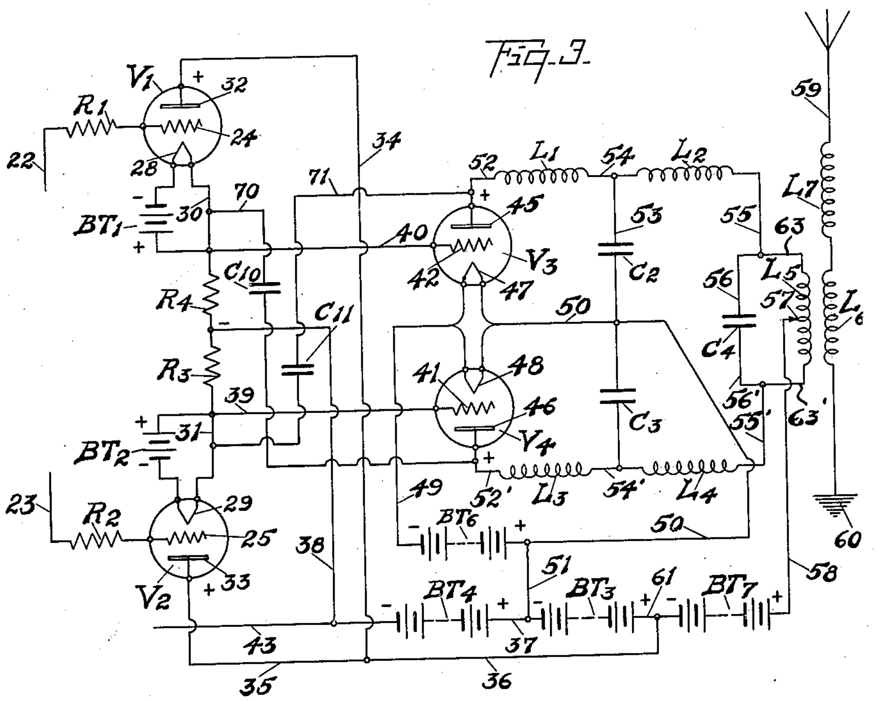
Fig. 3 is a detail diagrammatic view of a modification of the system shown in Fig. 1 or that of Fig. 2, whereby inverse feed back may be applied to either system.

Fig. 3 illustrates a modification of the system illustrated in Fig. 1 or of the system of Fig. 2, whereby an inverse feed back may be applied to the tubes $V_3$ and $V_4$ if desired.

In this case the cathode 28 of tube $V_1$ is connected over a conductor 70, including a blocking capacitor $C_{10}$, with plate 46 of tube $V_4$, and the cathode 29 of tube $V_2$ is connected over a conductor 71 including a capacitor $C_{11}$, with plate 45 of tube $V_3$.

Figure 4:
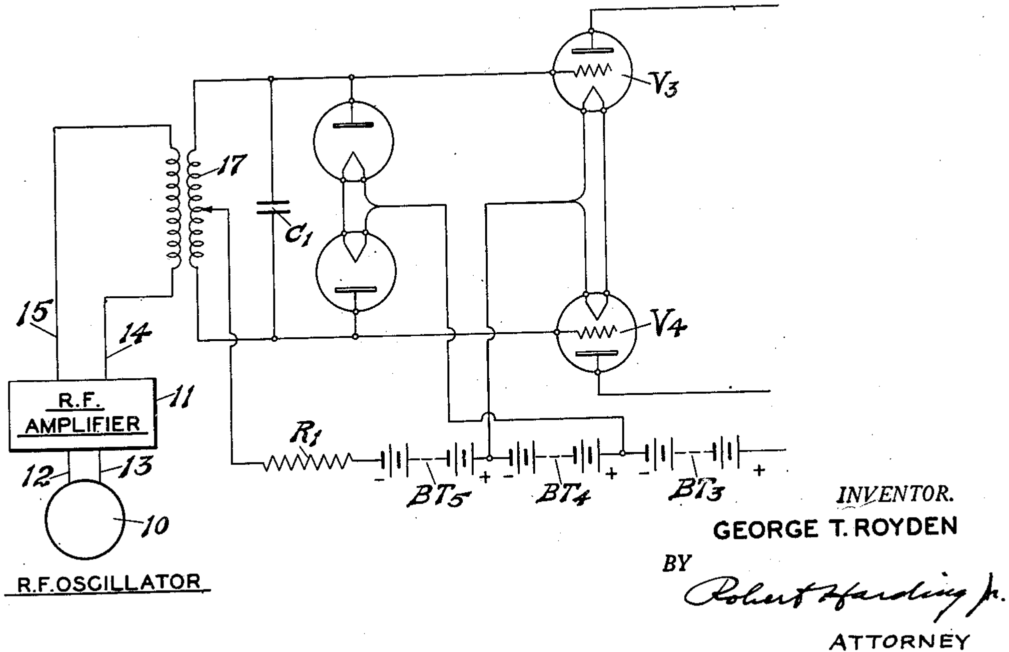
Fig. 4 is a detail diagrammatic view illustrating another modification of the invention.

Another way of producing square-top wave form is to employ two rectifiers, each with sufficient positive bias to prevent conduction through the rectifier until the desired flat-top potential is reached. Such a circuit is shown in Fig. 4.

As soon as the voltage in half of the tank circuit exceeds the combined voltage of battery $BT_3$ and battery $BT_4$ one of the rectifier tubes begins to conduct and prevents further appreciable rise in voltage between grid and cathode. Further rise in tank circuit voltage is absorbed in resistor $R_1$.

It is to be understood that the usual means for modulating the current supplied to the work circuit, or for signalling with such current may be employed. Since such means is old and well known and constitutes no part of the present invention, it has not been shown or described here.

It will be obvious to those skilled in the art that modification of the elements and conductor system may be employed to embody the invention. For example, the cathode heating currents may be provided by some source other than batteries, as, for example, where the heater type of cathodes are used the heating current may be supplied by transformers taking power from the commercial distribution system, and conventional rectifiers may replace the plate and filament heating batteries.

Also, while the invention has been shown and described, for the sake of simplicity, with an amplifier of the single stage type, a multi-stage amplifier system may be substituted when so desired, the amplifier tubes subsequent to the first taking their grid biases from the respective plate circuits of the preceding stage, it being understood that the circuit connections be such as to pass the necessary fundamental and harmonics without undue distortion in order to maintain the substantially square-top wave form in each stage of amplification. This will be fully understood from the description given hereinbefore of the single stage amplifier system.

What is claimed is:

1. In an electrical system for the production with high efficiency of an amplified high frequency current, a pair of amplifier vacuum tubes, each comprising a grid, a plate and a cathode, means for heating the cathode, and means for supplying current to the plate of each tube, in combination, with a plate circuit network associated with said tubes, said network including a common path for each plate current from the respective plates and also a plurality of parallel branches from said common path for each tube, the circuits of said branches having different electric characteristics, whereby each branch will be more favorable to the passage of current waves of a predetermined frequency than will be any other branch associated with the same tube, and means for impressing regularly and alternately on the grids pulsatory grid voltages having a predetermined substantially constant maximum value maintained for more than 90° of each half cycle of the fundamental frequency, whereby a substantially square-top wave comprising a fundamental sine wave and a plurality of the odd harmonics of said fundamental will be developed and maintained in the common path of said plate circuit network and at least one of said harmonics from each tube will freely circulate in the circuit which includes its respective favorable branch of the plate circuit network.

2. In an electrical system for the production with high efficiency of an amplified high frequency current, a pair of amplifier vacuum tubes, each comprising a grid, a plate and a cathode, means for heating the cathodes, and means for supplying current to the plate of each tube, in combination, with a plate circuit network associated with said tubes, said network including a common path for each plate current from the respective plates and also a plurality of parallel branches from said common path for each tube, the circuits of said branches having different electric characteristics, whereby each branch will be more favorable to the passage of current waves of a predetermined frequency than will be any other branch associated with the same tubes, means for impressing regularly and alternately on the grids pulsatory grid voltages having a predetermined substantially constant maximum value maintained for more than 90° of each half cycle of the fundamental frequency, whereby a substantially square-top wave comprising a fundamental sine wave and a plurality of the odd harmonics of said fundamental will be developed and maintained in the common path of said plate circuit network so that one of said harmonics from each tube will freely circulate in the circuit which includes its respective favorable branch of the plate circuit network, and the fundamental wave will circulate in another branch, a work circuit including an inductor secondary, and an inductor primary, included in a branch carrying the fundamental wave, arranged to energize said inductor secondary.

3. In an electrical system for the production with high efficiency of an amplifier high frequency current, the combination, with a pair of amplifier vacuum tubes, each comprising a grid, a plate and a cathode, a plate circuit network associated with said amplifier tubes and providing an individual set of plate circuits for each tube, said sets having a common return, each set of plate circuits having at least three branches, the circuit including one branch having its inductance and capacity such as to pass only a predetermined fundamental frequency, the circuit including a second branch having its inductance and capacity such as to pass only frequencies lower than a frequency three times that of the fundamental, the circuit including a third branch having its inductance and capacity such as to pass only frequencies lower than a frequency five times that of the fundamental, and means for supplying current to the plate of each tube, of means for developing a high frequency sine wave current, a circuit energized thereby, a second pair of vacuum tubes, each having a grid, a cathode and a plate, the second pair of vacuum tubes having a plate-cathode circuit with output means, means for supplying current to the plate of each tube of said second pair of vacuum tubes, means for impressing a potential on each grid of said second pair of tubes, a connection between each grid of said second set of tubes and the circuit energized by the sine wave currents, said connections being to opposite parts of said circuit, each connection including a resistor arranged to absorb the excess excitation voltage over that required to drive the grid to saturation so as to maintain on its respective grid a pulsatory voltage having a substantially constant maximum value for more than 90° of each cycle of said sine wave current, the said impressed voltages of 180° phase relation, grid conductors from the respective plate cathode circuits of the second set of vacuum tubes to the respective grids of the amplifiers, and a work circuit arranged to be energized by both the amplifier branches whose circuits are resonant to the fundamental frequency.

4. In an electrical system for the production with high efficiency of amplified high frequency current, the combination, with a pair of amplifier vacuum tubes, each comprising a grid, a plate and a cathode, a plate circuit network associated with the amplifier tubes and providing an individual set of plate circuits for each tube, said sets having a common return, and each set of plate circuits having at least three branches, the circuit including one branch having its inductances and capacity such as to pass only a predetermined fundamental frequency, the circuit including a second branch having its inductance and capacity such as to pass only frequencies lower than a frequency three times that of the fundamental, the circuit including a third branch having its inductance and capacity such as to pass only frequencies lower than a frequency five times that of the fundamental, and means for supplying current to the plate of each tube, of means for developing a high frequency sine wave current, a circuit energized thereby, a second pair of vacuum tubes, each having a grid, a cathode and a plate, the second pair of vacuum tubes having a plate-cathode circuit with output means, means for supplying current to the plate of each tube of said second pair of vacuum tubes, means for impressing a potential on each grid of said second pair of tubes, a connection between each grid of said second set of tubes and the circuit energized by the sine wave currents, said connections being to opposite parts of said circuit, each connection including a resistor arranged to absorb the energy in a predetermined portion of each peak of the sine waves, so as to maintain on its respective grid a pulsatory voltage having a substantially constant maximum value for more than 90° of each cycle of said sine wave current, the said impressed voltages being of 180° phase relation, grid conductors from the respective plate cathode circuits of the second set of vacuum tubes to the respective grids of the amplifiers, a work circuit, and means for energizing the work circuit from the last branch of the amplifier plate circuits.

5. In an electrical system for the production with high efficiency of an amplified high frequency current, a pair of amplifier vacuum tubes, each comprising a grid, a plate and a cathode, means for heating the cathode, and means for maintaining a constant positive potential on each plate of the tubes, in combination, with a plate circuit network associated with said tubes, said network including a common path for each plate current from the respective plates and also a plurality of parallel branches from said common path for each tube, the circuits of said branches having different electric characteristics, whereby each branch will be more favorable to the passage of current waves of a predetermined frequency than will be any other branch associated with the same tube, two of said branches including a loop circuit tuned to resonance at the fundamental frequency, means for impressing regularly and alternately on the grids pulsatory grid voltages having a predetermined substantially constant maximum value maintained for more than 90° of each half cycle of the fundamental frequency, whereby a substantially square-top wave comprising a fundamental sine wave and a plurality of the odd harmonics of said fundamental will be developed and maintained in the common path of said plate circuit network and at least one of said harmonics from each tube will freely circulate in the circuit which includes its respective favorable branch of the plate circuit network, a work circuit, and means for energizing the work circuit from the tuned loop circuit.

6. In an electrical system for the production with high efficiency of an amplified high frequency current, the combination, with a pair of amplifier vacuum tubes, each comprising a grid, a plate and a cathode, a plate circuit network associated with said amplifier tubes and providing an individual set of plate circuits for each tube, said sets having a common return, and each set of plate circuits having at least three branches, the circuit including one branch having its inductance and capacity such as to pass only a predetermined fundamental frequency, the circuit including a second branch having its inductance and capacity such as to pass only frequencies lower than a frequency three times that of the fundamental, the circuit including a third branch having its inductance and capacity such as to pass only frequencies lower than a frequency five times that of the fundamental, a loop circuit connected with the two branches for the fundamental frequency and itself resonant at said frequency, an inductor primary included in the loop, and means for supplying current to the plate of each tube, of means for developing a high frequency sine wave current, a circuit energized thereby, a second pair of vacuum tubes, each having a grid, a cathode and a plate, the second pair of vacuum tubes having a plate-cathode circuit with output means, means for supplying current to the plate of each tube of said second pair of vacuum tubes, means for impressing a potential on each grid of said second pair of tubes, a connection between each grid of said second pair of tubes and the circuit energized by the sine wave currents, said connections being to opposite parts of said circuit, each connection including a resistor arranged to absorb the energy in a predetermined portion of each peak of the sine waves so as to maintain on its respective grid a pulsatory voltage having a substantially constant maximum value for more than 90° of each cycle of said sine wave current, the said impressed voltages being of 180° phase relation, grid conductors from the respective plate cathode circuits of the second set of vacuum tubes to the respective grids of the amplifiers a work circuit, and an inductor secondary included in the work circuit and arranged to be energized by the inductor primary of the loop.

GEORGE TAYLOR ROYDEN.

REFERENCES CITED

The following references are of record in the file of this patent:

UNITED STATES PATENTS

| Number | Name | Date |
|---|---|---|
| 1,501,569 | Osnos | July 15, 1924 |
| 1,772,374 | Weinberger | Aug. 5, 1930 |
| 2,149,077 | Vance | Feb. 28, 1939 |
| 2,230,243 | Haffcke | Feb. 4, 1941 |
| 2,255,839 | Wilson | Sept. 16, 1941 |
| 2,284,181 | Usselman | May 26, 1942 |
| 2,299,571 | Dome | Oct. 20, 1942 |
| 2,340,364 | Bedford | Feb. 1, 1944 |